Aug. 6, 1940.   A. C. WOLLENSAK   2,210,519
VEHICLE CAB
Filed May 20, 1940   2 Sheets-Sheet 1
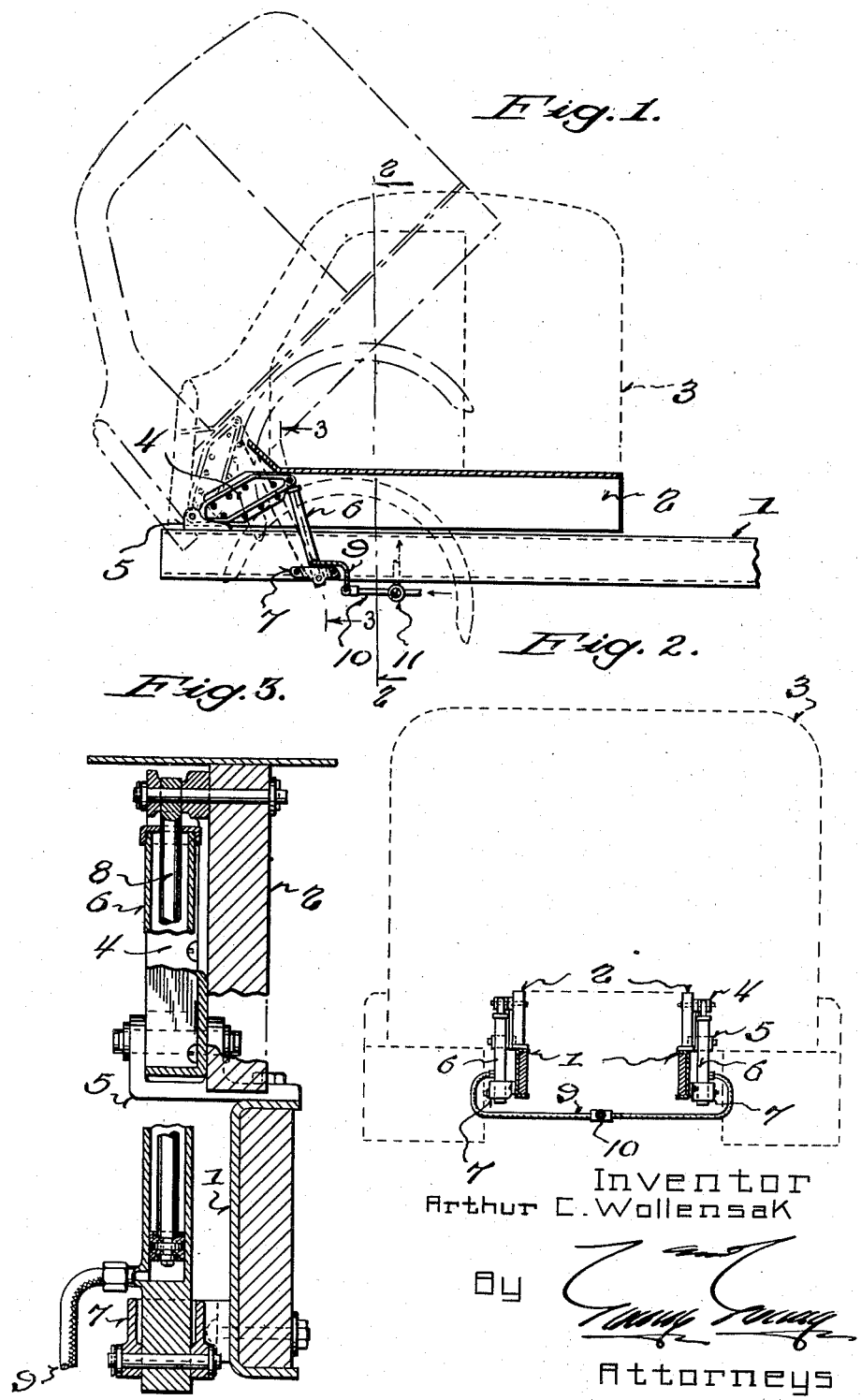
Inventor
Arthur C. Wollensak
By
Attorneys Aug. 6, 1940.  A. C. WOLLENSAK  2,210,519
VEHICLE CAB
Filed May 20, 1940   2 Sheets-Sheet 2
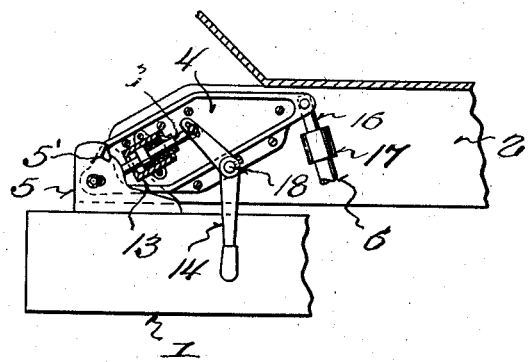
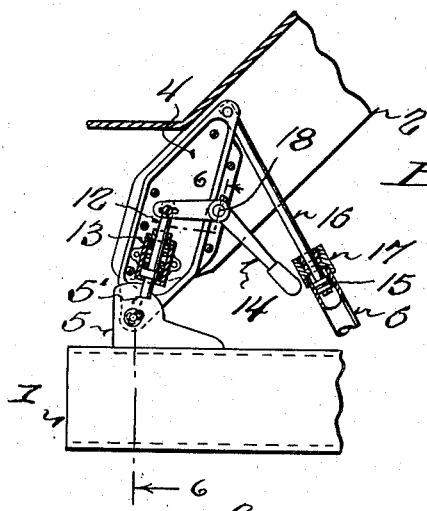
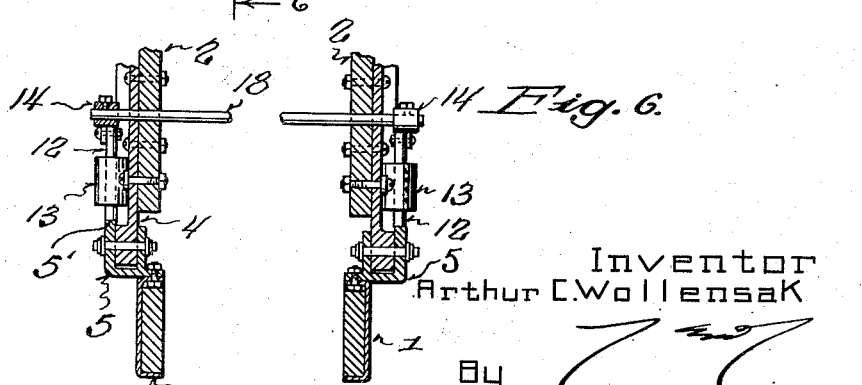
Inventor
Arthur C. Wollensak
By
Attorneys Patented Aug. 6, 1940

2,210,519

UNITED STATES PATENT OFFICE 2,210,519

VEHICLE CAB

Arthur C. Wollensak, Milwaukee, Wis., assignor to Sterling Motor Truck Company, Inc., Milwaukee, Wis.

Application May 20, 1940, Serial No. 336,229

10 Claims. (Cl. 180—89)

This invention pertains generally to tilting motor vehicle cabs, and more particularly to a forward-tilting cab normally positioned over and housing the vehicle engine, such as disclosed in United States Letters Patent No. 2,148,308.

In said Letters Patent, the cab is hingedly connected at its forward end to the vehicle chassis frame, and is manually tilted forward by means of detachable levers, to permit access to the engine, the levers serving to support the cab in tilted position.

Due to the fact that cabs of the foregoing type are exceedingly heavy, tilting of the same requires several operators, and considerable manual effort.

It is, therefore, the primary object of the present invention to provide cabs of the foregoing type with a power-actuated mechanism under control of a single operator, for both tilting and holding the cab in raised position.

Incidental to the foregoing, a more specific object of the invention is to provide hydraulic means for raising and lowering the cab to permit access to the engine.

Another object resides in the provision of a hydraulic ram, mounted on the chassis frame and connected with the cab adjacent its front pivoted end for tilting the cab forwardly, thus reducing the length and stroke of the ram required to a minimum.

A still further object is to provide means independent of the hydraulic ram for positively limiting forward tilting movement of the cab, and hold the same in tilted, raised position.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 1 is a fragmentary, elevational view of a vehicle frame and tiltable cab mounted thereon, with one form of the invention applied thereto, portions of the cab being shown in dotted lines;

Figure 2 is a transverse section taken on the line 2—2 of Figure 1;

Figure 3 is an enlarged, detail section taken on the line 3—3 of Figure 1;

Figures 4 and 5 are fragmentary elevations illustrating a modified form of the invention; and Figure 6 is a transverse, detail section taken on the line 6—6 of Figure 5.

Referring now more particularly to the accompanying drawings, the numeral 1 designates the side frames of a vehicle chassis, upon which the sills 2 of a cab 3, shown in dotted lines, are tiltably mounted. Secured to the sides of the sills 2 adjacent their forward ends, are plates 4, the forward ends of which are pivotally connected to brackets 5 secured to the frames 1, whereby the cab may be tilted forwardly to a raised position, as shown in dot and dash lines in Figure 1, permitting access to the vehicle engine (not shown), which is carried by the chassis frames and housed by the cab.

In that form of the invention illustrated, a pair of hydraulic rams 6 are interposed between the chassis frames 1 and the cab sills 2, the lower ends of the rams being pivotally mounted in brackets 7 secured to the sides of the frames 1. The ram plungers 8 are pivotally connected at their upper ends to the plates 4.

The rams 6 are provided with flexible connections 9, communicating with a pressure fluid supply line 10, connected with a conventional compressor (not shown), which may be actuated by the vehicle motor or a separate source of power. Obviously, the common supply line equalizes pressure in both rams. A valve 11 in the common line 10 controls the operation of the rams.

It is believed that the operation of the present invention will be quite apparent, in that when it is desired to tilt the cab forwardly to raised position as shown in dot and dash lines in Figure 1, the operator merely opens the valve 11, admitting pressure fluid to the rams 6 to raise the plungers 8, which operation tilts the cab forwardly to a point where its center of gravity is positioned in substantially vertical alinement with the pivotal axis of the cab, thus reducing strain on the rams while holding the cab in raised position. Upon relieving the fluid pressure in the rams, the cab is permitted to slowly return to its normal position on the chassis frame.

Due to the fact that the present relative position of the rams and cab permits the use of an exceedingly short ram of small capacity, in some instances it may be desirable to provide a positive stop for the forward tilting of the cab, thus eliminating impact and strain between the plunger head and cylinder cap. Also, in the tilted, raised position of the cab, it may be desirable to positively lock the same to reduce stress and strain upon the rams and connecting lines to a minimum.

To accomplish the foregoing, the modification shown in Figures 4 to 6, exclusive, provides a spring-urged plunger 12 mounted within a cylinder 13 fastened to the sill plate 4, and connected to the hand lever 14 pivotally carried by the plate 4.

In the present form, the brackets 5, to which the plates 4 are pivotally connected, are provided with notches 5' into which the plungers 12 drop when the cab is in raised, tilted position, and before the heads 15 of the plungers 16 engage the caps 17 of the rams 6. To release the cab, the hand lever 14 is actuated to withdraw the plungers 12 from the notches 5'. Where stops are provided on both sides of the cab, the same may be released from either side because of a transverse shaft 18, connecting the opposite release levers 14.

From the foregoing explanation considered in connection with the accompanying drawings, it will be seen that exceedingly simple, compact, and efficient power actuating mechanism has been provided for forwardly tilting a vehicle cab, to permit access to a motor housed by the cab.

An important feature of the invention resides in connecting the operating rams to the cab closely adjacent its forward pivotally connected end, due to the fact that in vehicles of the present type, frequently the load-carrying body is positioned so closely to the rear of the cab as to prevent interposing a power-actuated mechanism between the rear end of the cab and the load-carrying body.

Furthermore, due to the length of movement of the rear end of the cab, were a hydraulic ram attached to that end, it would have to be of excessive length and stroke, and if of relatively small capacity, would have to have a multiple or telescoping action, which would materially increase the cost.

The present invention overcomes the foregoing, in that the rams are connected to the cab at a point adjacent its forward end, whereby rams of minimum length and stroke are capable of transmitting sufficient tilting movement to the cab to allow full access to the vehicle engine.

I claim:

1. In a motor vehicle including a frame and a forward-tilting cab mounted thereon: power-actuated means carried by the frame and connected to the cab adjacent its front end for forwardly tilting the same to raised position.

2. In a motor vehicle including a frame and a forward-tilting cab mounted thereon: power-actuated means carried by the frame and connected to the cab adjacent its front end for forwardly tilting and holding the cab in its raised position.

3. In a motor vehicle including a frame and a forward-tilting cab mounted thereon: hydraulic means carried by the frame and connected to the cab adjacent its front end for forwardly tilting the same to raised position.

4. In a motor vehicle including a frame and a forward-tilting cab mounted thereon: hydraulic means carried by the frame and connected to the cab adjacent its front end for forwardly tilting and holding the same in raised position.

5. In a motor vehicle including side frames and a cab having a pair of sills pivotally connected at their forward ends to said side frames: power-actuated means carried by the frames and connected to said sills adjacent their front pivotal ends for forwardly tilting the sills to an inclined position.

6. In a motor vehicle including side frames and a cab having a pair of sills pivotally connected at their forward ends to said side frames: power-actuated means carried by said frames and connected to said sills adjacent their front pivotal ends for forwardly tilting and holding the sills in an inclined position.

7. In a motor vehicle including side frames and a cab having a pair of sills pivotally connected at their forward ends to said side frames: hydraulic rams pivotally connected to said side frames and to said sills adjacent their front pivotal ends for forwardly tilting the sills to an inclined position.

8. In a motor vehicle including side frames and a cab having a pair of sills pivotally connected at their forward ends to said side frames: hydraulic rams pivotally connected to said side frames and to said sills adjacent their front pivotal ends for forwardly tilting and holding the sills in an inclined position.

9. In a motor vehicle including side frames and a cab having a pair of sills pivotally connected at their forward ends to said side frames: a pair of rams carried by the side frames and connected to said sills adjacent their front pivotal ends for forwardly tilting the sills to an inclined position, and means independent of said rams for limiting the tilting movement of said sills and holding the same in an inclined position.

10. In a motor vehicle including side frames and a cab having a pair of sills: brackets mounted on said side frames pivotally connected with the forward ends of said sills and having notches formed therein, detents carried by said sills for engaging said notches when in inclined position, and a pair of hydraulic rams pivotally connected to said side frames and to said sills adjacent their forward pivotal ends for tilting the sills upwardly to an inclined position.

ARTHUR C. WOLLENSAK.